US008863095B2

(12) United States Patent
Bharadwaj et al.

(10) Patent No.: US 8,863,095 B2
(45) Date of Patent: Oct. 14, 2014

(54) RECORDING AND PLAYBACK OF SYSTEM INTERACTIONS IN DIFFERENT SYSTEM ENVIRONMENTS

(75) Inventors: Sunil Bharadwaj, Portland, OR (US); Martine B. Wedlake, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 13/103,925

(22) Filed: May 9, 2011

(65) Prior Publication Data

US 2012/0291048 A1 Nov. 15, 2012

(51) Int. Cl.
*G06F 9/44* (2006.01)
*G06F 11/34* (2006.01)
*G06F 11/36* (2006.01)

(52) U.S. Cl.
CPC ........ *G06F 11/3612* (2013.01); *G06F 11/3414* (2013.01); *G06F 2201/865* (2013.01); *G06F 11/3636* (2013.01)
USPC .......................................... 717/135; 717/127

(58) Field of Classification Search
CPC ............ G06F 11/3644; G06F 11/3636; G06F 11/3612; G06F 2201/865
USPC .......................................... 717/127, 130, 135
See application file for complete search history.

(56) References Cited

U.S. PATENT DOCUMENTS

| | | | |
|---|---|---|---|
| 6,101,524 A * | 8/2000 | Choi et al. ..................... | 718/102 |
| 6,405,364 B1 | 6/2002 | Bowman-Amuah | |
| 6,587,969 B1 | 7/2003 | Weinberg et al. | |
| 6,631,345 B1 * | 10/2003 | Schumacher et al. .......... | 703/22 |
| 7,647,584 B2 | 1/2010 | Sluiman | |
| 2003/0055883 A1 * | 3/2003 | Wiles, Jr. ...................... | 709/203 |
| 2006/0047496 A1 * | 3/2006 | Genkin et al. .................. | 703/22 |
| 2006/0101404 A1 | 5/2006 | Popp et al. | |
| 2006/0101476 A1 | 5/2006 | Robert | |
| 2011/0246971 A1 * | 10/2011 | Chua et al. .................... | 717/135 |

FOREIGN PATENT DOCUMENTS

| | | |
|---|---|---|
| EP | 0 404 505 A2 | 12/1990 |
| WO | WO 03/005202 A1 | 1/2003 |

OTHER PUBLICATIONS

Meszaros, G., "Agile Regression Testing Using Record & Playback", OOPSLA '03 Companion of the 18th annual ACM SIGPLAN conference on Object-oriented programming, systems, languages, and applications, Oct. 26-30 2003, p. 353-360, ACM, New York, NY.

* cited by examiner

*Primary Examiner* — Brian W Wathen
(74) *Attorney, Agent, or Firm* — Kenneth L. Sherman, Esq.; Michael Zarrabian, Esq.; Sherman & Zarrabian LLP (57) ABSTRACT

A system includes a recording interface configured for receiving tagged information for recording system interactions. A recording module is configured for communicating with the recording interface and for recording the system interactions from a first computing environment between at least one application and a common component based on the tagged information. A repository is configured for storing the recorded system interactions. A playback interface is configured for retrieving a portion of the stored system interactions from the repository and playing back the retrieved portion of system interactions for simulating system interactions for a second computing environment.

20 Claims, 8 Drawing Sheets

| Request Time | Identifier | Inputs | Output | Response Time |
|---|---|---|---|---|
| T1 | NT_1 | | | TR1 |
| T2 | THR1_1 | | | TR2 |
| T3 | THR2_1 | | | TR3 |
| T4 | NT_4 | | | TR4 |
| T5 | THR1_2 | | | TR5 |

FIG. 5

| Request Time | Identifier | Inputs | Output | Response Time |
|---|---|---|---|---|
| TP1 | THR1_1 | | | TPR1 |
| TP2 | THR2_1 | | | TPR2 |
| TP3 | THR1_2 | | | TPR3 |
| | | | | |
| | | | | |

RECORDING AND PLAYBACK OF SYSTEM INTERACTIONS IN DIFFERENT SYSTEM ENVIRONMENTS

BACKGROUND

The present invention relates generally to recording computing system interactions for playback, and in particular, playing back recorded computing system interactions from a first computing environment in a second computing environment.

Simulators are available for simulating calls to system components, for example when testing an application for a storage device that is not available. Further, debuggers intercept and log the traffic between an application and a component, for example a management application and an interface. The simulators and debuggers are designed to work in a single environment.

BRIEF SUMMARY

Embodiments of the invention provide a method and system for enhanced playback of system interactions from a first computing environment in a second computing environment. In one embodiment of the invention, a system includes a recording interface configured for receiving tagged information for recording system interactions. A recording module is configured for communicating with the recording interface and for recording the system interactions from a first computing environment between at least one application and a common component based on the tagged information. A repository is configured for storing the recorded system interactions. A playback interface is configured for retrieving a portion of the stored system interactions from the repository and playing back the retrieved portion of system interactions for simulating system interactions for a second computing environment.

Another embodiment of the invention provides a computer program product for playing back recorded interactions from a first computing environment in a second computing environment. The computer program product comprising: a computer readable storage medium having computer usable program code embodiment therewith. The computer usable code comprising computer usable program code configured to record interactions from the first computing environment between a plurality of executing processes of at least one application and a common component based on tagged information. The computer usable code further comprises computer usable program code configured to retrieve a portion of the recorded interactions and to play back the retrieved portion of recorded interactions for simulating interactions for the second computing environment.

In one embodiment of the invention, a method includes receiving tagged information for recording processing interactions from a first computing environment. The processing interactions between at least one application and a common component is recorded based on the tagged information. The recorded processing interactions are stored in a memory. A portion of the stored processing interactions are retrieved from the memory. The retrieved portion of processing interactions is played back for simulating processing interactions for a second computing environment.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for file systems, as well as operation and/or component parts thereof. While the following description will be described in terms of file systems and processes for clarity and placing the invention in context, it should be kept in mind that the teachings herein may have broad application to all types of systems, devices and applications.

Embodiments of the invention provide recording of system processing interactions between computing applications and their respective internal processes in one computing environment and playing back the recorded interactions in another computing environment. The playback of recorded interactions simulates the execution of application logic in a controlled debug environment that mimics the environment in which a problem or a behavior of interest may have been observed. The embodiments assist users to understand the impact of interactions on logic consuming the data returned by a common component, such as a common information model object manager (CIMOM), a host bus adapter (HBA), an application programming interface (API) library, etc.

The embodiments of the invention provide simulation of the processing interactions with a common component from another environment, and observing the effects of those interactions on code branches consuming the responses of the common component in order to debug problems, perform "what-if analysis," etc. Additionally, the embodiments of the invention may be used to simulate the interaction of a common component, by itself, by simulating other applications that typically interact with the common component.

The embodiments of the invention take into consideration elements that may be unique to a particular computing/processing environment that needs to be simulated including the presence of multiple applications and/or multiple threads/processes within applications interacting with a common component. For example, a user may be interested in debugging a first application A. However, there may also be other third-party applications B and C that are interacting with the common component and this complex interaction may be a factor in a problem that has been observed and is one that needs to be simulated. Another example may be that a specific sequence of calls made by an application needs to be simulated (both in order specific and also in the same elapsed time between calls). Additionally, the content of responses sent back by a common application and the elapsed time in sending the response may need to be simulated. The embodiments of the invention provide a system and method to record interactions made during a logical operation of an application to be debugged in an environment where a problem is occurring, and subsequently playback the operation in another environment where the problem can be debugged.

In one embodiment, the invention provides a system including a recording interface configured for receiving tagged information for recording system interactions. A recording module is configured for communicating with the recording interface and for recording the system interactions from a first computing environment between at least one application and a common component based on the tagged information. A repository is configured for storing the recorded system interactions. A playback interface is configured for retrieving a portion of the stored system interactions from the repository and playing back the retrieved portion of system interactions for simulating system interactions for a second computing environment.

Figure 1:
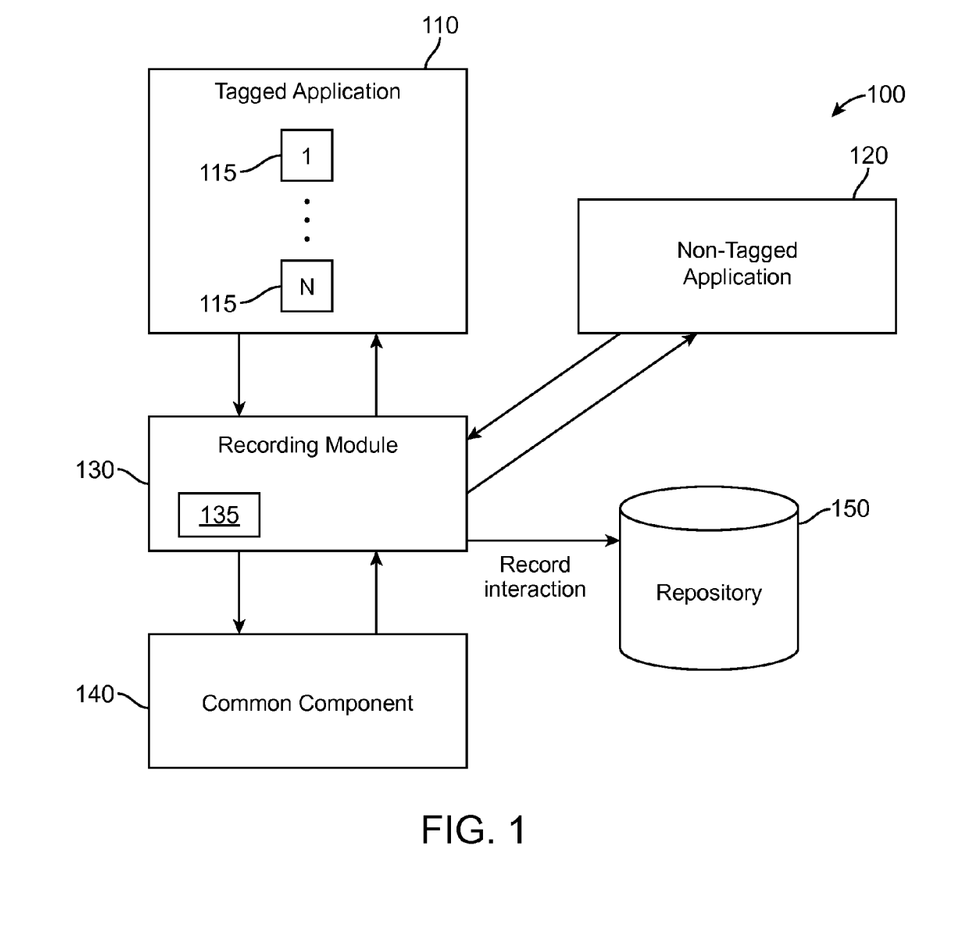
FIG. 1 shows a block diagram of a system and components for recording system interactions, according to an embodiment of the invention.

FIG. 1 shows a block diagram of a system 100 and components for recording system interactions, according to an embodiment of the invention. The system 100 comprises a tagged application 110 (including multiple threads/processes 115), a non-tagged application 120, a recording module 130 including a recording API 135, a common component 140, and a repository 150, according to an embodiment of the invention. The tagged application 110 refers to an application that makes specific API calls (i.e., tagged calls) to the recording API 135 of the recording module 130. The non-tagged application 120 refers to an application that is unaware of the presence of the recording module 130.

In one embodiment of the invention, repository 150 may be any memory device, memory structure, component, virtual device, etc., for storing information including system interactions (e.g., input/output data, thread/process 115 identification, timing information, etc.).

In one embodiment of the invention, calls made by the tagged application 110 include tagged calls made during the logical operation of the tagged application 110. The responses by a system component to the calls made by the tagged application 110 are recorded by the recording module 130. Responses are associated to the tagged calls made by the tagged application 110. Any interactions made by a third-party application (i.e., non-tagged application 120) on the common component 140 (since the interaction of the other applications can be a factor in a problem being debugged) are also recorded by the recording module 130.

In one example, the recording module 130 may intercept all calls between all tagged applications 110 and non-tagged applications 120 and the common component 140 that they interact with. The recording API 135 may be used for applications that need to be debugged. In one embodiment of the invention, tagged applications 110 pass information (e.g., arguments, identifiers, etc.) to the recording API 135 and invoke the recording module 130 instead of invoking the common component 140 directly. The repository 150 stores the information recorded by the recording module 130.

In one embodiment of the invention, the application code of the tagged application 110 is modified to issue the tagged calls to the recording API 135 for recording interaction information, such as variable values, thread states, object information, thread identification information, etc. In one example, in the computing/processing system environment to be recorded (e.g., a first environment), execution of the tagged application 110 code results in the interaction recorded in a file that is stored in the repository 150.

In one embodiment of the invention, the recording API 135 receives the following tagged calls from the tagged application 110: RegisterRecordingForThread, StartRecordingForThread, CallCommonComponentRecording, and StopRecording. In one example, tagged calls represent the following: RegisterRecordingForThread: registers a specific thread to have its interactions recorded; StartRecordingForThread: starts recording of interactions for the particular thread that was registered; CallCommonComponentRecording: records the interactions with a common component that interacts with the registered thread; StopRecording: stops recording of interactions that began to be recorded by the StartRecordingForThread tagged call. In one example, all threads/processes within an application that can be tagged (i.e., tagged application 110) are required to make the RegisterRecordingForThread call once before any other processing may be performed. In one example, a unique identifier (e.g., a name, a number, a code, combined name/number/code, etc.) is passed as an argument for each thread/process 115. The recording module uses this information for the tagged call to StartRecordingForThread.

In one embodiment of the invention, the StartRecordingForThread tagged call is made by any thread/process 115 in the tagged application 110. The StartRecordingForThread tagged call may be made by any thread/process 115 in an application that will make a call to the common component 140. In one example, the argument includes a unique identifier that is passed into the StartRecordingForThread tagged call. The StartRecordingForThread tagged call blocks until all threads/processes 115 that have invoked the RegisterRecordingForThread have called the StartRecordingForThread call. In one example the StartRecordingForThread tagged call is a mechanism to synchronize the processing clocks for various threads/processes 115 for recording. When all registered threads/processes 115 have called the StartRecordingForThread tagged call, an internal clock is started for recording calls made by the non-tagged application 120. In one example, an identifier NT may be used as a generic tag for all non-tagged applications 120.

In one embodiment of the invention, the CallCommonComponentRecording tagged call is made by threads/processes 115 within the tagged application 110. In one example, the actual call and argument information, along with the unique identifier for the threads/processes 115, is passed in. The recording module 130 may make the actual call to receive component information and recorded information from the repository 150. In one example, the CallCommonComponentRecording tagged call returns the response returned by the common component 140.

In one embodiment of the invention, the StopRecording tagged call stops recording by the recording module 130.

Figure 2:
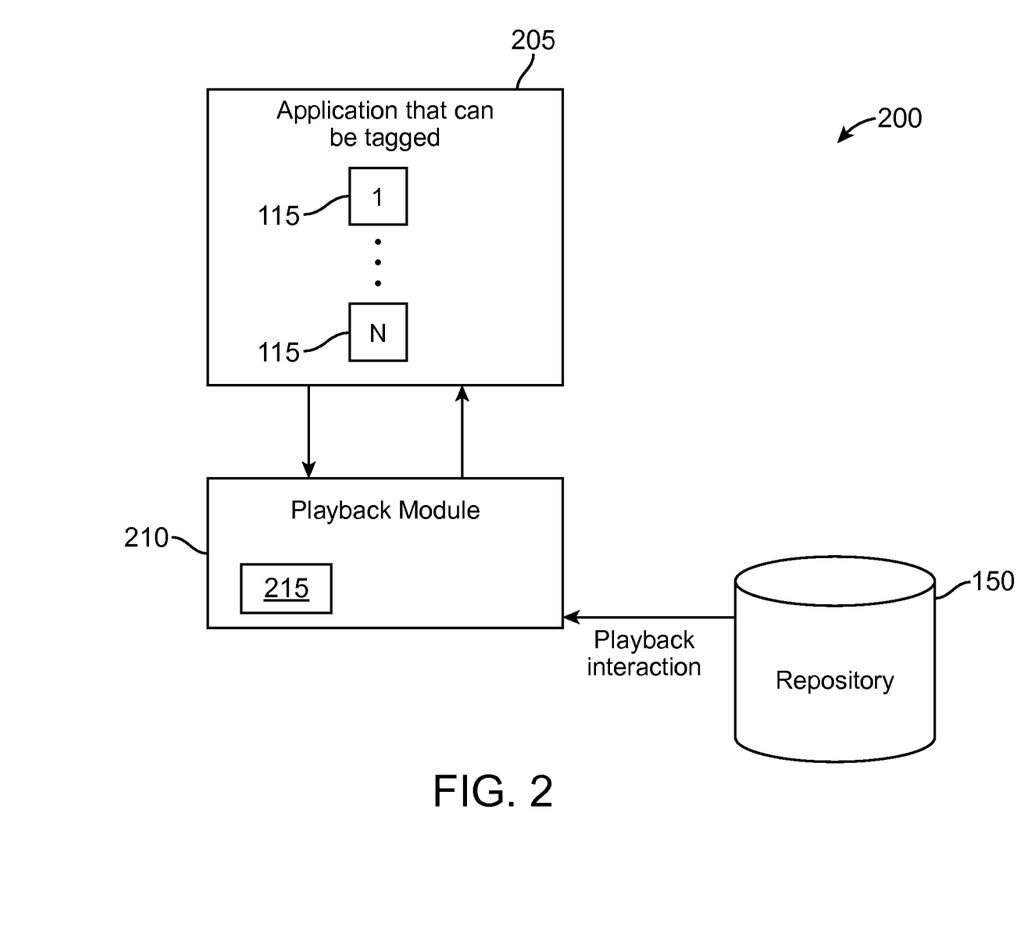
FIG. 2 shows a block diagram of a system and components for playback of system interactions, according to an embodiment of the invention.

FIG. 2 shows a block diagram of a system 200 and components for playing back system interactions, according to an embodiment of the invention. The system 200 comprises a tagged application 205, a playback module 210 including a playback API 215, and the repository 150, according to an embodiment of the invention. In one example, the playback API 215 may be used by applications capable of being tagged (e.g., tagged application 205) for simulating the interactions from another environment by using previously recorded interactions stored in the repository 150.

During playback of system interactions, the elapsed time to make calls to a common component in a new environment can be different from the elapsed time in the environment in which recording was performed (due to differences in processing speed, debugging by user, etc.). In one example, the playback module 210 attempts to keep the relative elapsed call timing between calls made to common component by an application. In one embodiment of the invention, the playback module 210 adds time delays if needed to maintain the relative elapsed call timing.

In one example, in another environment, the tagged application 205 (that has been modified to issue calls to the playback API 215) is run/executed with information from the recorded file from the repository 150 as input. Interactions previously recorded are used to return data to the tagged application 205 and to as closely mimic the environment from which recording was originally made in. In one example, playback may be performed for common application code if desired. In this example, playback invokes the common component using the stored recorded interactions as input data and attempts to preserve the relative elapsed time between invocations.

In one embodiment of the invention, the playback API 215 receives the following tagged calls from the tagged application 205: RegisterPlaybackForThread, StartPlaybackForThread, CallCommonComponentPlayback, and StopPlayback. In one example, tagged calls represent the following: RegisterPlaybackForThread: registers a specific thread to have recorded interactions played back as input; StartPlaybackForThread: starts playing back the recorded interactions for the particular thread that was registered; CallCommonComponentPlayback: plays back the recorded interactions with a common component that interacts with the registered thread; StopPlayback: stops playing back of interactions that began to be played back by the StartPlaybackForThread tagged call. In one example, all threads/processes 115 within the tagged application 205 need to make a call to RegisterPlaybackForThread once before any other processing is performed. The RegisterPlaybackForThread tagged call passes a unique identifier for a thread/process 115 as an argument. The playback module 210 uses the argument for the StartPlaybackForThread tagged call.

In one example, the StartPlaybackForThread tagged call is made by any application that may be able to be tagged, such as tagged application 205. The StartPlaybackForThread tagged call needs to be made by any thread/process 115 in a tagged application 205 that will make a call to a common component, such as common component 140. The unique identifier is passed as an argument for all threads/processes 115. In one example, the StartPlaybackForThread tagged call blocks until all threads/processes that have invoked the RegisterPlaybackForThread tagged call have called the StartPlaybackForThread tagged call. In one example, the StartPlaybackForThread is a mechanism for synchronizing the processing clocks for various threads/processes 115 for playback.

In one example, the CallCommonComponentPlayback tagged call is made by threads/processes 115 within a tagged application 205. The actual call and argument information, along with the unique identifier for the threads/processes 115, is passed in. The playback module 210 looks up the stored call in the repository 150 and returns the response data. In one example, the playback module 210 computes the time elapsed since a previous call to the CallCommonComponentPlayback tagged call returned during playback, and compares that duration with the elapsed time in the recorded data, and adds any delays if needed before returning the response.

In one embodiment of the invention, the StopPlayback tagged call stops playback by the playback module 210.

Figure 3:
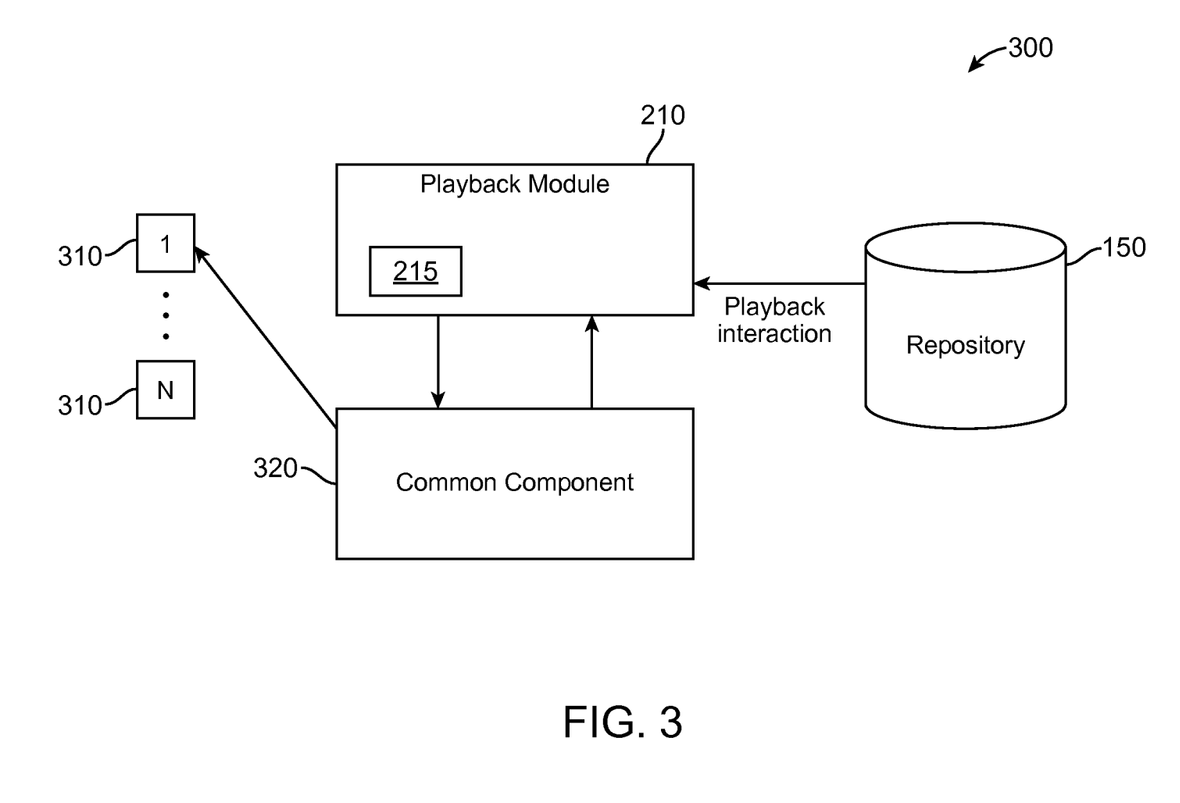
FIG. 3 shows a block diagram of a system and components for playback of system interactions with a common component, according to an embodiment of the invention.

FIG. 3 shows a block diagram of a system 300 and components for playing back system interactions, according to an embodiment of the invention. The system 300 comprises a common component 320, a playback module 210 including a playback API 215, applications 310 (1 to N) and the repository 150, according to an embodiment of the invention. In one example, the playback API 215 may be used for simulating the interactions from another environment by using previously recorded interactions stored in the repository 150.

During playback of system interactions with the common component 320, the elapsed time to make calls to a common component in a new environment can be different from the elapsed time in the environment in which recording was performed (due to differences in processing speed, debugging by user, etc.). In one example, the playback module 210 attempts to keep the relative elapsed call timing between calls made to a common component by an application. In one embodiment of the invention, the playback module 210 adds time delays if needed to maintain the relative elapsed call timing.

In one example, in another computing/processing environment, the common component 320 is run/executed with information from the recorded file from the repository 150 used as input to the common component 320. Interactions previously recorded are used to return data to the common component 320 and to as closely mimic the environment from which recording was originally made. In one example, playback invokes the common component 320 using the inputs recorded from the stored recorded interactions and attempts to preserve the relative elapsed time between invocations.

In one embodiment of the invention, the playback API 215 receives the following tagged calls from the common component 320: StartPlaybackForCommonComponent and StopPlaybackForCommonComponent. In one example, the StartPlaybackForCommonComponent call is made by the common component 320 to start the playback. In one example, the StopPlaybackForCommonComponent call stops the playback from the playback module 210.

Figure 4:
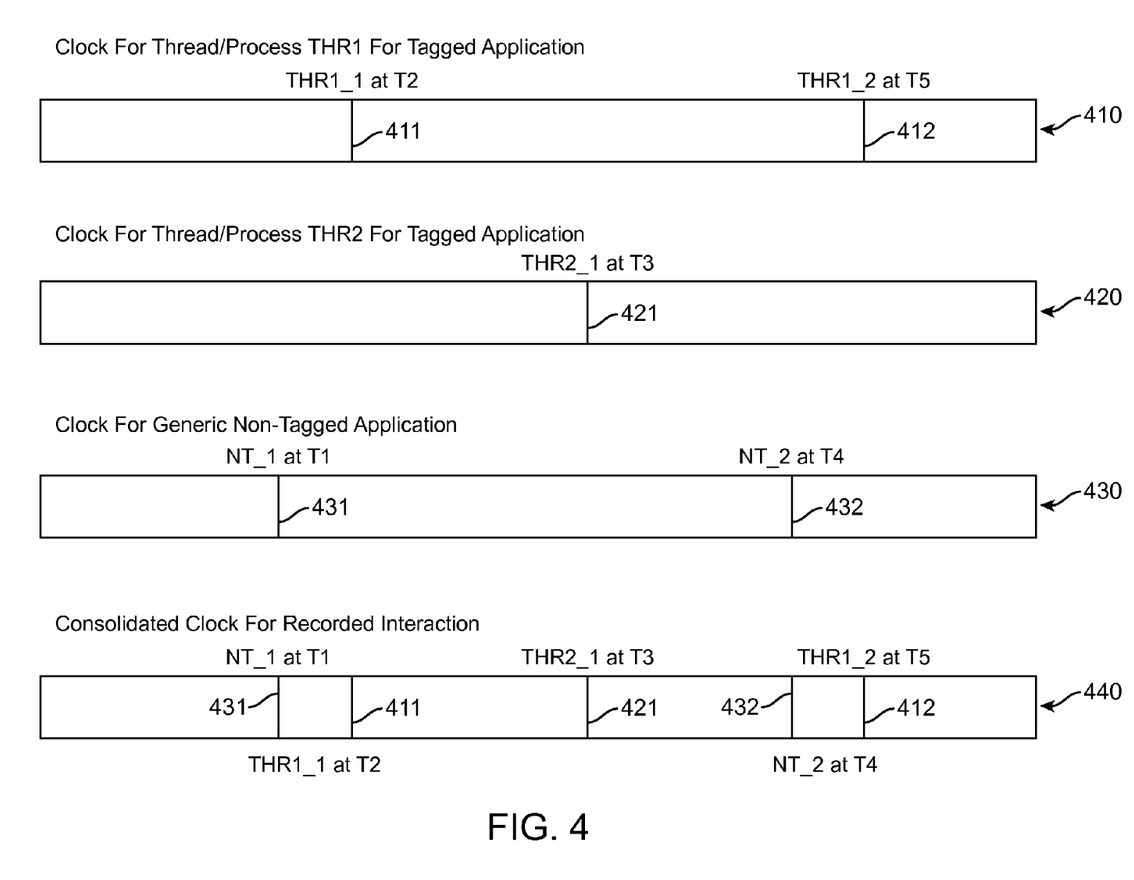
FIG. 4 shows an example representation of clocks for threads recorded by a tagged application, according to an embodiment of the invention.

FIG. 4 shows an example representation of clocks for threads recorded by a tagged application 110/205, according to an embodiment of the invention. The clocks or timing indicators for thread/processes 115 for a first thread represented by THR1 for a tagged application 110 is shown at reference 410. The clocks or timing indicators for thread/processes 115 for a second thread represented by THR2 for a tagged application 110 is shown at reference 420. The clocks or timing indicators for thread/processes 115 for a generic non-tagged application 120 represented by NT is shown at reference 430. The consolidated clocks or timing indicators for recorded interaction is shown at reference 440.

Figure 5:
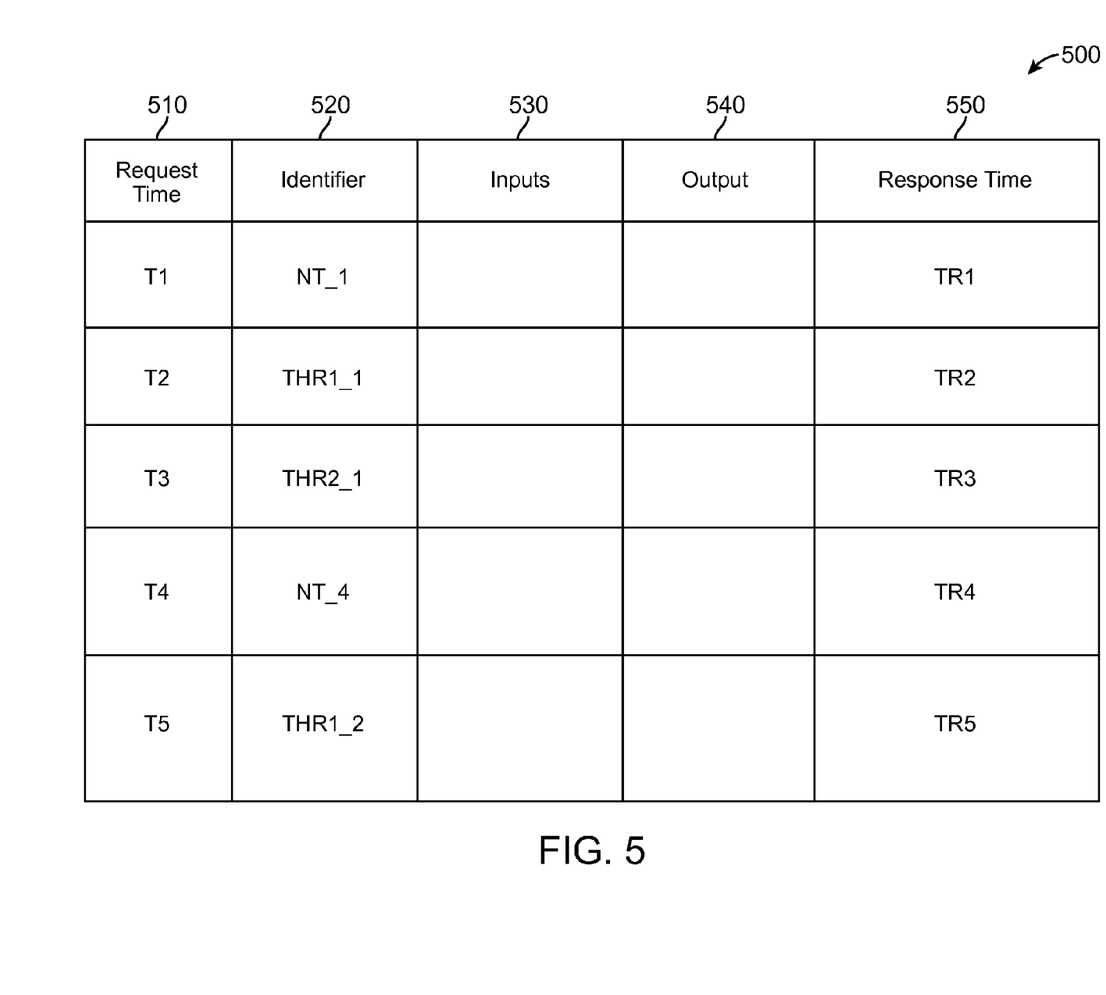
FIG. 5 shows an example repository structure for recorded system interactions, according to an embodiment of the invention.

FIG. 5 shows an example repository structure 500 for organizing recorded system interactions in repository 150 for the example shown in FIG. 4, according to an embodiment of the invention. As shown, the repository 150 structure 500 includes columns/fields for storing request times 510, unique identifiers 520, inputs 530, outputs 540, and response times 550.

In one example, THR1 and THR2 each have invoked RegisterRecordingForThread and StartRecordingForThread. This results in the clocks for all applications/threads/processes being synchronized. In one embodiment of the invention, an internal clock in the recording module 130 records the relative times when interactions are been made.

At a first time, T1, a call is made by a non-tagged application (e.g., non-tagged application 120) that is being recorded by the recording module 130. In one example the identifier NT_1 (431) represents the non-tagged application at time T1. In this example, a sequential number is added to the end of the identifier by the recording module 130. At a second time, T2, a thread/process 115 represented by THR1_1 (411) makes a call to CallCommonComponentRecording that results in an entry made with an identifier THR1_1 (411) in the repository 150 structure 500. An actual call is made to the common application 140 and the data recorded in the repository 150. At a third time, T3, THR2 makes a call CallCommonComponentRecording that results in an entry made with identifier THR2_1 (421) in the repository 150 structure 500, where a sequential number is added to the end of the identifier by the recording module 130. An actual call is then made to the common component 140 and the data is recorded in the repository 150. At a fourth time, T4, a call is made by a non-tagged application 120 that is recorded using identifier NT_2 432). At a fifth time, T5, THR1 makes a call to CallCommonComponentRecording that results in an entry made with the identifier THR1_2 (412) in the repository 150 structure 500. An actual call is made to the common component 140 and the data is recorded in the repository 150. The tagged application 110 then invokes the StopRecording call to stop the recording.

Figure 6:
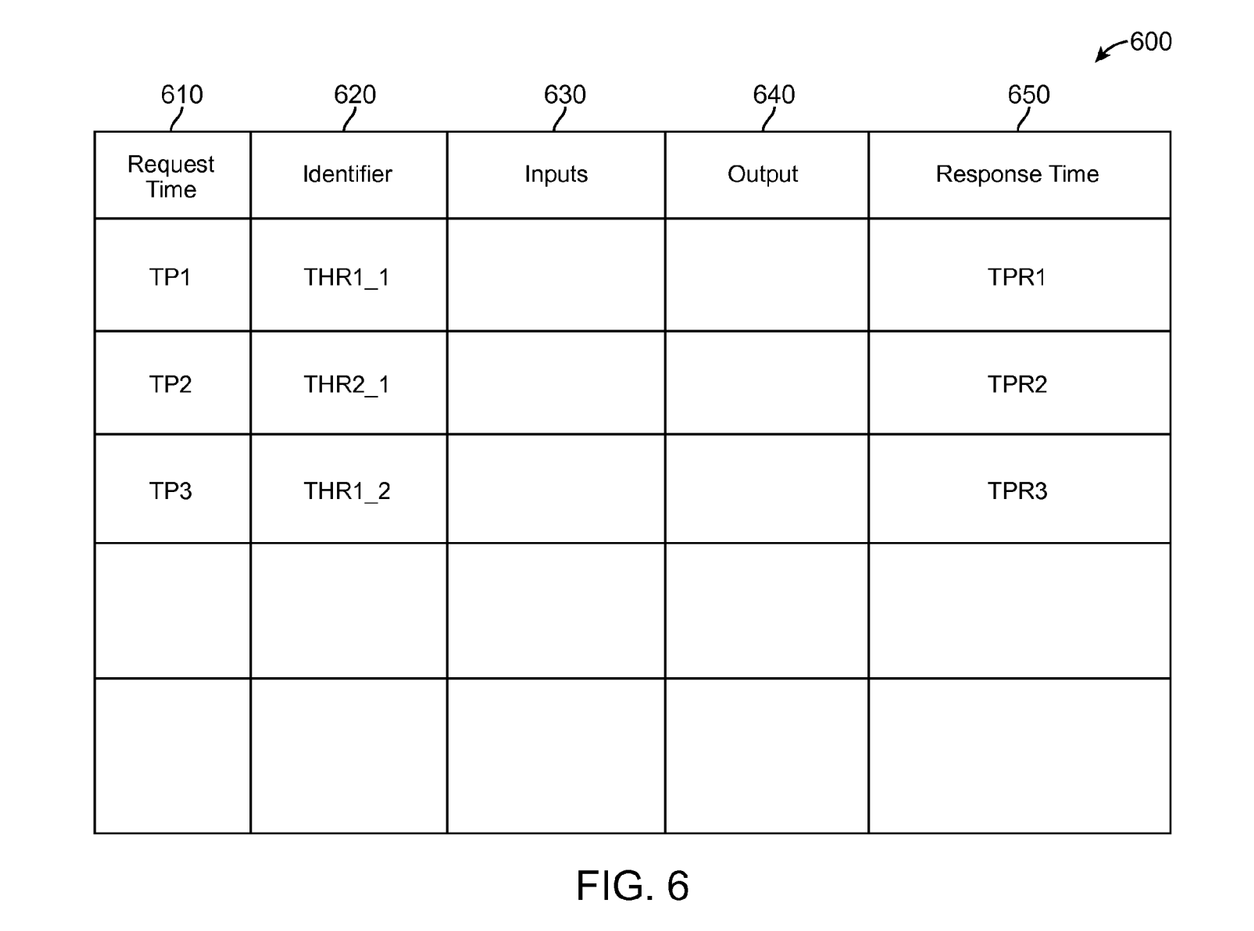
FIG. 6 shows an example repository structure for playback of recorded system interactions, according to an embodiment of the invention.

FIG. 6 shows an example repository structure 600 for organizing playback of recorded system interactions by a tagged application 205, according to an embodiment of the invention. As shown, the repository 150 structure 600 includes columns/fields for retrieving request times 610, unique identifiers 620, inputs 630, outputs 640, and response times 650. In one example, threads THR1 and THR2 have invoked the RegisterPlaybackForThread and StartPlaybackForThread calls. This results in the clocks for all applications/threads/processes being synchronized based on an internal clock in the recording module 130 that records the relative times when interactions have been made. At a first time for a thread playback is represented by TP1, the tagged application 205 invokes the CallCommonComponentPlayback call. The playback module 205 waits, if necessary, and then sends the response data from the recorded file in the repository 150. In one example, the playback module 205 matches up an entry using the identifier THR1_1, where THR1 is the identifier passed in for the CallCommonComponentPlayback call with the sequential number appended. In this example, TPR1 is the same time as a second time for a thread playback represented by TP2, which is the elapsed time for a first call made by a tagged application 205.

At TP2, the tagged application 205 invokes the CallCommonComponentPlayback call. The playback module 210 waits, if necessary, and then sends the response data from the recorded file in the repository 150. The playback module 210 matches up an entry using the identifier THR2_1, where TPR2−TPR1 is the same as T3−T2, which is the elapsed time between calls made by the tagged application 205.

At TP3, the tagged application 205 invokes the CallCommonComponentPlayback call. The playback module 210 waits, if necessary, and then sends the response data from the recorded file in the repository 150. The playback module 210 matches up an entry using the identifier THR1_2 where TPR3−TPR2 is the same as T5−T3, which is the elapsed time between calls made by the tagged application 205.

In one example, the common component 320 invokes a call to StartPlaybackForCommonComponent. This results in the clocks for all application/threads/processes being synchronized based on the internal clock that recorded the relative times when interactions were being made. The playback module 210 keeps invoking the common component 320 and passes in the recorded inputs for tagged applications and non-tagged applications at time intervals, such that the timing difference between calls matches the time differences from the recording.

Figure 7:
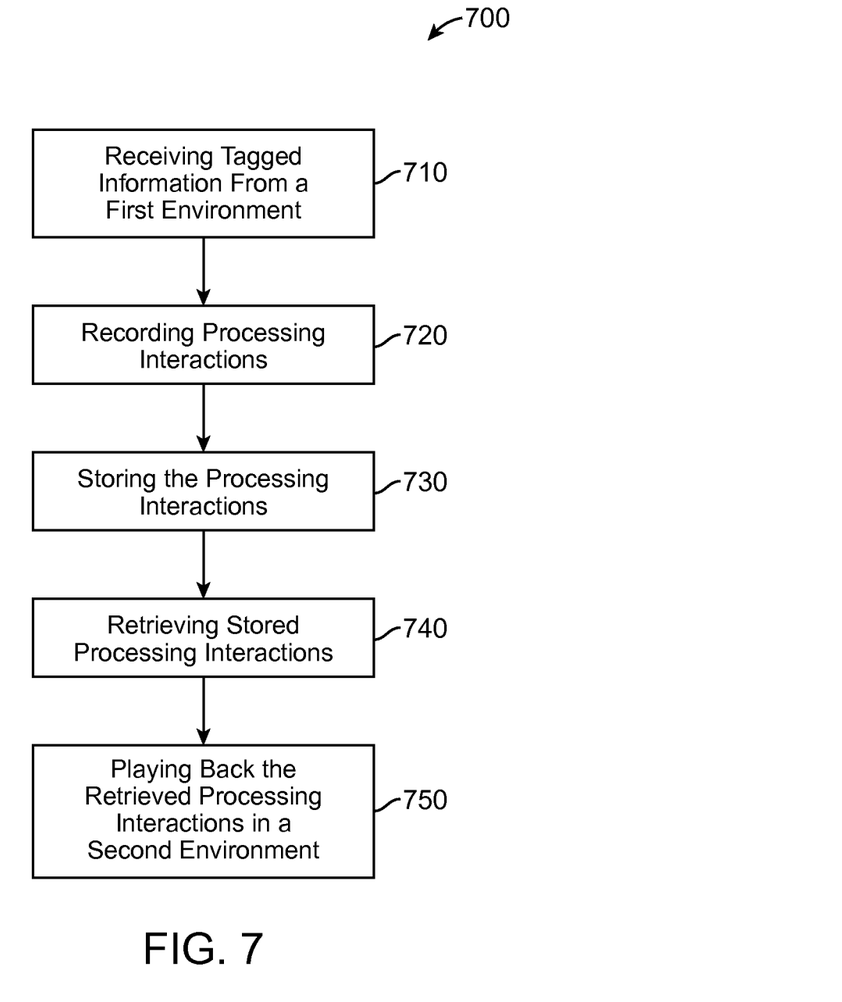
FIG. 7 shows a block diagram of a process for recording and playing back system interactions, according to an embodiment of the invention.

FIG. 7 shows a process 700 for recording and playing back system interactions, according to an embodiment of the invention, comprising:

Process block 710: Tagged information is received from a first processing/computing environment.

Process block 720: A recording module records processing interactions for the first environment.

Process block 730: The repository stores the recorded processing interactions for the first environment.

Process block 740: The stored processing interactions are retrieved by a playback module.

Process block 750: The retrieved processing interactions are played back by the playback module in a second processing/computing environment. Clocks are synchronized between thread processes of a tagged application with the retrieved processing interactions. Time delays are inserted with the retrieved processing interactions for simulating processing in the second environment.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
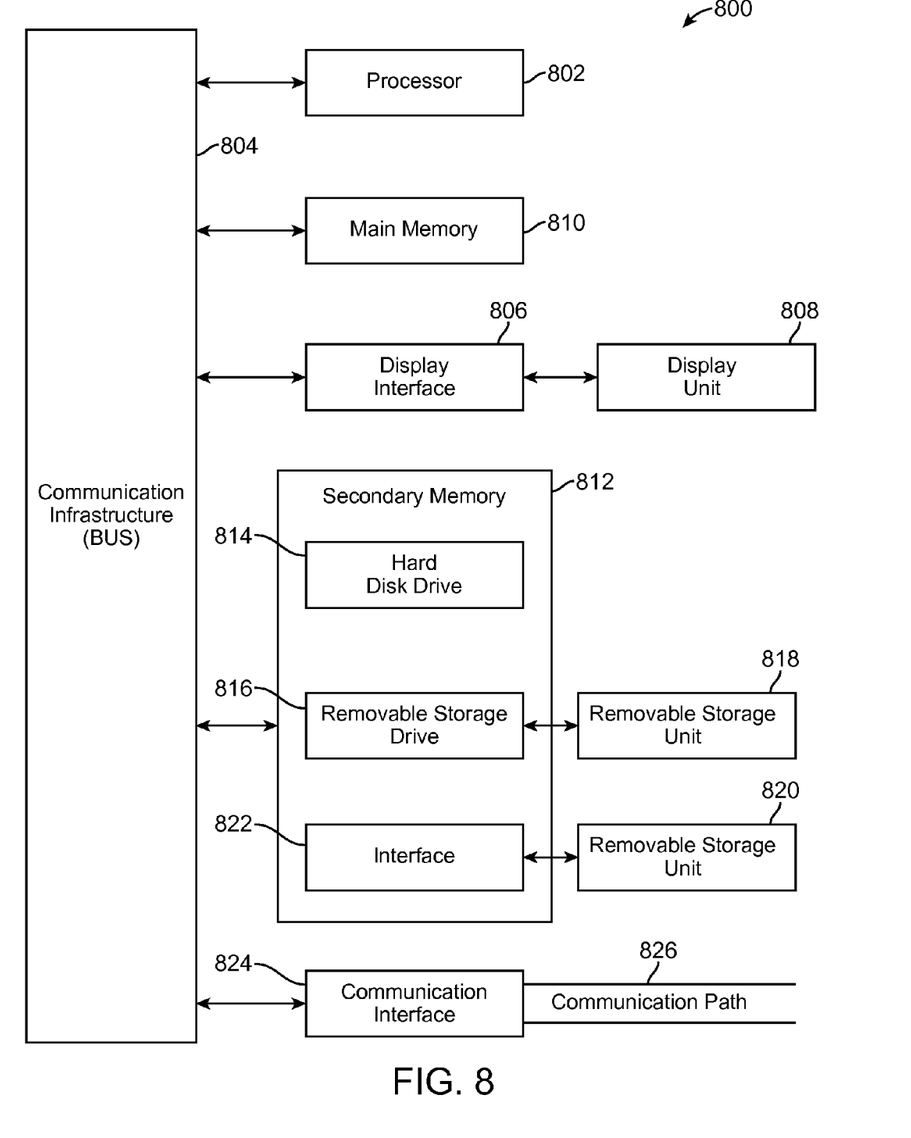
FIG. 8 illustrates a high level block diagram of an information processing system useful for implementing one embodiment of the invention.

FIG. 8 is a high level block diagram showing an information processing system 800 useful for implementing one embodiment of the present invention. The computer system 800 includes one or more processors, such as one or more processors 802. The processor 802 is connected to a communication infrastructure 804 (e.g., a communications bus, cross-over bar, or network).

The computer system can include a display interface 806 that forwards graphics, text, and other data from the communication infrastructure 804 (or from a frame buffer not shown) for display on a display unit 808. The computer system also includes a main memory 810, preferably random access memory (RAM), and may also include a secondary memory 812. The secondary memory 812 may include, for example, a hard disk drive 814 and/or a removable storage drive 816, representing, for example, a floppy disk drive, a magnetic tape drive, or an optical disk drive. The removable storage drive 816 reads from and/or writes to a removable storage unit 818 in a manner well known to those having ordinary skill in the art. Removable storage unit 818 represents, for example, a floppy disk, a compact disc, a magnetic tape, or an optical disk, etc., which is read by and written to by removable storage drive 816. As will be appreciated, the removable storage unit 818 includes a computer readable medium having stored therein computer software and/or data.

In alternative embodiments, the secondary memory 812 may include other similar means for allowing computer programs or other instructions to be loaded into the computer system. Such means may include, for example, a removable storage unit 820 and an interface 822. Examples of such means may include a program package and package interface (such as that found in video game devices), a removable memory chip (such as an EPROM, or PROM) and associated socket, and other removable storage units 820 and interfaces 822 which allow software and data to be transferred from the removable storage unit 820 to the computer system.

The computer system may also include a communications interface 824. Communications interface 824 allows software and data to be transferred between the computer system and external devices. Examples of communications interface 824 may include a modem, a network interface (such as an Ethernet card), a communications port, or a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This communications path 826 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 810 and secondary memory 812, removable storage drive 816, and a hard disk installed in hard disk drive 814.

Computer programs (also called computer control logic) are stored in main memory 810 and/or secondary memory 812. Computer programs may also be received via a communication interface 824. Such computer programs, when run, enable the computer system to perform the features of the present invention as discussed herein. In particular, the computer programs, when run, enable the processor 802 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
a recording interface configured for receiving tagged information for recording system interactions;
a recording module configured for communicating with the recording interface and for recording the system interactions from a first computing environment between one or more of multiple applications and a common component based on the tagged information;
a repository configured for storing the recorded system interactions, wherein the repository comprises multiple fields for individually storing request times, inputs, outputs and response times for the recorded system interactions; and
a playback interface configured for retrieving a portion of the stored system interactions from the repository and playing back the retrieved portion of system interactions for simulating system interactions for a different second computing environment with another common component in the second computing environment, wherein the first computing environment includes processing for the one or more of the multiple applications and multiple threads within the multiple applications, wherein the one or more multiple applications and multiple threads within the multiple applications are simulated in the second computing environment.

2. The system of claim 1, wherein the common component and the another common component each comprises one or more of a common information model object manager (CI-MOM), a host bus adapter (HBA), and an application programming interface (API) library.

3. The system of claim 2, wherein the recorded system interactions comprise system calls between one or more of the multiple applications and the common component, and wherein the portion of the stored system interactions are played back for simulating system interactions for the second computing environment with the another common component and additional system interaction from one or more different applications, wherein specific sequences of system calls between the one or more of the multiple applications and the common component in the first computing environment and particular elapsed time between the system calls are simulated in the second computing environment.

4. The system of claim 3, wherein the tagged information comprises application calls from a tagged application.

5. The system of claim 4, wherein the tagged application communicates indirectly with the common component through the recording interface.

6. The system of claim 4, wherein the tagged application communicates with a plurality of thread processes.

7. The system of claim 1, wherein the playback interface is further configured for playing back the retrieved portion of system interactions for simulating system interactions for the second computing environment between the playback interface and the another common component, wherein the second environment has different timing for system interactions than the first environment, wherein request times and response times are retrieved from the repository for simulating timing of the first computing environment on the second computing environment.

8. The system of claim 7, wherein the playback interface is further configured for playing back the retrieved portion of system interactions in the different second environment based on synchronizing clocks between a plurality of thread processes of the one or more of the multiple applications with the retrieved system interactions, and insertion of time delays determined by using the retrieved request times and response times and based on the different timing for system interactions.

9. A computer program product for playing back recorded interactions from a first computing environment in a different second computing environment, the computer program product comprising:
a non-transitory computer readable storage medium having computer usable program code embodied therewith, the computer usable code comprising:
computer usable program code configured to record interactions from the first computing environment between a plurality of executing processes of one or more of multiple applications and a common component based on tagged information;
computer usable program code configured to store in a repository the recorded interactions, wherein the repository comprises multiple fields for individually storing request times, inputs, outputs and response times for the recorded system interactions; and
computer usable program code configured to retrieve a portion of the stored interactions and to play back the retrieved portion of the stored interactions for simulating interactions for the different second computing environment with another common component in the second computing environment, wherein the first computing environment processes the one or more of the multiple applications and multiple threads within the multiple applications, wherein the one or more of the multiple applications and the multiple threads within the multiple applications processed by the first computing environment are simulated in the second computing environment.

10. The computer program product of claim 9, wherein the common component and the another common component each comprises one or more of a common information model object manager (CIMOM), a host bus adapter (HBA), and an application programming interface (API) library.

11. The computer program product of claim 10, wherein the stored interactions comprise programming calls between the one or more of the multiple applications and the common component, wherein the portion of the stored interactions are played back for simulating interactions for the second computing environment with the another common component and additional interaction from one or more different applications, and wherein specific sequences of programming calls between the one or more of the multiple applications and the common component in the first computing environment and particular elapsed time between the programming calls are simulated in the second computing environment.

12. The computer program product of claim 11, wherein the tagged information comprises application calls from a tagged application.

13. The computer program product of claim 12, wherein the tagged application communicates indirectly with the common component through a recording interface of the recording module.

14. The computer program product of claim 13, further comprising: computer usable code configured to play back the retrieved portion of the stored interactions for simulating programming interactions for the second computing environment between a playback interface and the another common component.

15. The computer program product of claim 14, further comprising: computer usable code configured to play back the retrieved portion of the stored interactions in the second environment based on synchronizing clocks between a plurality of thread processes of the tagged application with the retrieved recorded interactions, and insertion of time delays, wherein the second environment has different timing for interactions than the first environment, wherein request times and response times are retrieved from the repository for simulating timing of the first computing environment on the second computing environment.

16. A method comprising:
receiving tagged information for recording processing interactions from a first computing environment;
recording the processing interactions between one or more of multiple applications and a common component based on the tagged information;
storing the recorded processing interactions in a repository, wherein the repository comprises multiple fields for individually storing request times, inputs, outputs and response times for the recorded processing interactions;
retrieving a portion of the stored processing interactions from the repository; and
playing back the retrieved portion of the stored processing interactions for simulating processing interactions for a different second computing environment with another common component in the second computing environment, wherein the first computing environment includes processing the one or more of the multiple applications and multiple threads within the multiple applications that are simulated in the second computing environment.

17. The method of claim 16, further comprising:
playing back the retrieved portion of the stored processing interactions for simulating processing interactions for the second computing environment between a playback interface and the another common component, wherein the second environment has different timing for interactions than the first environment, wherein request times and response times are retrieved from the repository for simulating timing of the first computing environment on the second computing environment.

18. The method of claim 17, further comprising: synchronizing clocks between a plurality of thread processes of a tagged application with the retrieved portion of the stored processing interactions.

19. The method of claim 18, further comprising: inserting time delays with the retrieved portion of the stored processing interactions determined by using the retrieved request times and response times and based on the different timing for interactions for simulating processing in the second environment.

20. The method of claim 16, further comprising:
playing back the retrieved portion of the stored processing interactions for simulating processing interactions for the second computing environment between a playback interface and one or more different applications, wherein specific sequences of processing interactions between the one or more of the multiple applications and the common component in the first computing environment and particular elapsed time between the processing interactions are simulated in the second computing environment.

* * * * *